United States Patent [19]

Corwin et al.

[11] Patent Number: 4,788,531

[45] Date of Patent: * Nov. 29, 1988

[54] AUTOMATIC FAULT REPORTING SYSTEM

[75] Inventors: Charles E. Corwin, Kent; Neal W. Moore, Bellevue, both of Wash.

[73] Assignee: The Boeing Company, Seattle, Wash.

[*] Notice: The portion of the term of this patent subsequent to Jun. 23, 2004 has been disclaimed.

[21] Appl. No.: 851,641

[22] Filed: Apr. 14, 1986

Related U.S. Application Data

[63] Continuation of Ser. No. 563,296, Nov. 17, 1983, Pat. No. 4,675,675.

[51] Int. Cl.⁴ .............................................. G06F 15/20
[52] U.S. Cl. .................................... 340/945; 340/963; 73/178 R
[58] Field of Search ............... 340/945, 963, 967, 971, 340/973, 825.16; 244/76 R, 75 R, 227; 73/178 R, 178 T; 364/424, 427–428, 434, 439, 463, 551, 580, 480, 481; 455/98, 18, 12

[56] References Cited

U.S. PATENT DOCUMENTS

| | | | |
|---|---|---|---|
| 4,470,116 | 9/1984 | Ratchford | 364/424 |
| 4,510,803 | 4/1985 | Perara | 73/178 R |
| 4,592,055 | 5/1986 | Fischer et al. | 364/434 |
| 4,675,675 | 7/1987 | Corwin et al. | 340/945 |

FOREIGN PATENT DOCUMENTS

| | | | |
|---|---|---|---|
| 1064290 | 12/1983 | U.S.S.R. | 340/963 |
| 1298627 | 12/1972 | United Kingdom | 340/945 |

OTHER PUBLICATIONS

Crawforth, "Realtime Flight Test Control", IEEE Transaction on Aerospace and Elect. Sys., vol. AES-2, No. 4 (1966).

Batten, "The Use of Computer Testing", Aircraft Engineering, vol. 47, No. 6 (1975).

Primary Examiner—John W. Caldwell, Sr.
Assistant Examiner—Tyrone Queen
Attorney, Agent, or Firm—Conrad O. Gardner; B. A. Donahue

[57] ABSTRACT

An aircraft automatic fault reporting system having a plurality of ARINC 429 low-speed data buses between the aircraft maintenance control panel and the aircraft communications addressing and reporting system provides two-way communication therebetween. Detected faults through an eight-digit fault code are by means of a transient logic circuit under certain conditions of the aircraft communications and addressing systems provided to maintenance personnel thereby eliminating flight crew use of FRM's.

1 Claim, 5 Drawing Sheets

AUTOMATIC FAULT REPORTING SYSTEM

This is a continuation of application Ser. No. 563,296, filed Nov. 17, 1983, now U.S. Pat. No. 4,675,675

This invention relates to fault reporting and, more particularly, to an aircraft maintenance scheduling system by which fault-related data onboard an operational aircraft is processed through a communications channel to a ground terminal.

Heretofore, the patent literature, e.g. U.S. Pat. No. 3,689,888, has shown a pulse-position modulated alarm system having automatic fault detection and utilizing radio transmission channels. This system, however, did not relate to maintenance or aircraft fault detection nor provide for scheduling of maintenance.

U.S. Pat. No. 2,484,462 relates to airway traffic control systems and, while demonstrative of radio transmission concepts, does not include automatic fault detection or maintenance scheduling.

U.S. Pat. No. 3,242,321 discloses an automatic machine analyzer which does demonstrate maintenance and automatic fault detection but fails to show an aircraft application or the scheduling of maintenance, or the utilization of radio transmissions of data.

U.S. Pat. No. 3,720,911 is illustrative of motor vehicle identification and speed control systems which provide for maintenance, utilize radio transmission, and relate to scheduling of maintenance; however, this patent does not show aircraft applications or automatic fault detection.

A further monitoring system specifically for construction vehicles is shown in U.S. Pat. No. 4,119,943. This patent shows automatic fault detection, radio transmission, and scheduling of maintenance but fails to relate to aircraft fault problems or transmission and signal processing of such type data.

U.S. Pat. No. 4,239,454 shows a system for monitoring bearings and other rotating equipment and does relate to maintenance and maintenance scheduling radio transmission, and automatic fault detection, but has no bearing upon aircraft maintenance of fault detection problems.

A plant maintenance control system is shown in U.S. Pat. No. 4,383,298. Radio transmission of data, automatic fault detection, and aircraft applications are not shown in this patent system.

U.S.S.R. Pat. No. 637,823 relates to aircraft servicing monitoring units and does disclose aircraft maintenance and maintenance scheduling but fails to disclose automatic fault detection or radio transmission of information in this regard.

Japanese Patent No. 57-77335 discloses a remote-controlled monitoring system for construction vehicles. It appears to be quite similar in concept to the aforementioned system for monitoring construction vehicles shown in U.S. Pat. No. 4,119,943. The Japanese Patent No. 57-77335 system does relate to automatic fault detection, radio transmission, and maintenance and maintenance scheduling design but fails to relate to aircraft applications and fault detection of onboard data.

Further literature relating to maintenance and scheduling of maintenance of machines does not appear to relate to the problems of fault detection and aircraft and automatic signal processing through radio transmission channels.

Present solutions to maintenance include providing flight crews of aircraft with FRM (Fault Reporting Manual, of equivalent). The FRM contains possible fault indications. The user is lead through logic tree formatted pages containing yes/no type questions. The end result of a fault analysis is an eight digit code which represents a specific fault condition. The user then radios this code to the ground and/or records it in the flight's log book.

On the ground, the maintenance personnel apply the fault code to the FIM (Fault Isolation Manual, or equivalent) which further isolates the fault. At this point, if the exact cause of the fault is not known, the maintenance personnel are given a general idea of what the cause(s) of the problem is and what maintenance action(s) will be required when the airplane arrives, thereby tending to minimize the possibility of a delayed or grounded flight.

The FRM is bulky and difficult to use. EX: Present FRMs are somewhat large and total approximately 600 $8\frac{1}{2} \times 11$ inch pages. The book is divided by Airline Transport Association (ATA) chapter. Each chapter contains a pictorial contents, an alphabetic contents, and the fault code diagrams (which make up approximately 4/5 of the manual). The fault code diagrams (logic trees) contain an average of 5 to 10 fault codes each. There are roughly 2500 fault codes in each airplane copy. On short flights a flight crew may wait until the flight has landed and is taxiing to the terminal before using the FRM. This creates two problems: viz. (1) The crew may not have seen or remembered all conditions, actions, and indications when the fault occurred, thus creating an unreliable fault code; and (2) the fault codes are designed to be radioed in the air in order to allow the maintenance personnel time for part procurement, planning, etc. If the fault is of an intermittent type, a future failure may be indicated. If the fault is too quickly gone, the flight crew will likely not see all indications, if any at all.

It can be seen that the present FRM requires 100% human interpretation and fault code communication, thereby leading to possible inaccurate or incomplete fault codes.

Accordingly, it is an object of the present invention to reduce the aforementioned FRM/FIM operator workloads.

It is a further object of the present invention to provide an automatic fault reporting system (AFRS) for maximizing the amount of data available for fault detection and analysis while reducing both the required understanding and workload of the operator below that of present FRM/FIM.

In accordance with a preferred embodiment of the present AFRS:

(a) presently installed digital and analog system outputs are monitored;

(b) presently programmed fault indications are detected;

(c) by comparing all fault data, a most likely cause is determined and assigned a fault code (e.g. an eight-digit alpha numeric code);

(d) a "send data" discrete signal is awaited from the aircraft's onboard FMC (Flight Management Computer);

(e) on command, a "data present" discrete signal is sent to the aircraft's onboard ARINC Communications Addressing and Reporting System (ACARS) and a "transmission available" discrete signal is awaited;

(f) on command, the aforementioned fault code is sent to ACARS which transmits data via VHF communications to the ARINC network on the ground which, in turn, couples fault code via land wires to applicable airline; and, then (g) a "transmission complete and received" representative discrete signal from ACARS is awaited, otherwise the step is repeated until received.

A full understanding of the present invention, and of its further objects and advantages and the several unique aspects thereof, will be had from the following description when taken in conjunction with the accompanying drawings in which.

Prior to description of the present AFRS system and operation thereof, a Glossary of terms utilized hereinafter in the description and FIGURES is now presented;

GLOSSARY OF TERMS

ACARS: (ARINC Communications Addressing and Reporting System) System presently installed on many airplanes at operator's option. Used for two-way digital communications from airplane to ground station via ARINC communications network.

ARINC: (Aeronautical Radio Inc.) North American organization which, among other services, provides a ground-based digital air/ground communications network for subscribing airplane operators and standards for airplane design.

BITE: (Built In Test Equipment) Monitoring circuits, on a system level, which periodically check the operation of that system. In the event of a failure, a signal is sent to display a flag and/or store the fault in that system's or another system's memory for maintenance referral.

FIM: (Fault Isolation Manual) Aircraft manufacturing company, e.g. Boeing Airplane Company prepared manual presently used by operator's ground personnel on airplanes. The manual is used to decode the fault codes transmitted by the flight crews and to determine the corrective maintenance actions required when the airplane arrives.

AFRS: (Automatic Fault Reporting System) System of fault reporting which also replace presently used FRM type manuals and portions of presently used FIM type manuals.

SITA: (Societie Internationale de Telecommunications Aeronautiques) European equivalent of ARINC which will soon provide a worldwide ground-based digital air/ground communication network for subscribing airplane operators.

FMC: (Flight Management Computer) Primary flight management system. Used to plan route profile, speed, altitudes, etc.

FCC: (Flight Control Computer) System which provides electronic control of all control surfaces (i.e. rudder, elevators, ailerons, etc.) per instructions of FMC.

TMC: (Thrust Management Computer) System which provides electronic control of engine thrust per instructions of FMC.

DFDAU: (Digital Flight Data Acquisition Unit) System used to acquire real time airplane data, format it per airline requests, and provide selectable output to the flight recorders.

EFIS: (Electronic Flight Instrument System) Primary navigation data displaying system (attitude, altitude, course, etc.)

EICAS: (Engine Indicating and Crew Alerting System) Primary caution, warning, and status condition displaying system.

EEC: (Electronic Engine Control) System which provides actual control logic to engines per various system inputs (i.e. TMC, Pitot-Static, etc.).

ADC: (Air Data Computer) Senses environmental conditions around the airplane (i.e. airspeed, altitude, etc.) from data provided by pilot static system.

IRS: (Inertial Reference System) System which senses airplane movement and is used to calculate altitude, position, speed, etc. for navigation purposes.

FQPU: (Fuel Quantity Processing Unit) System used to calculate fuel quantity.

DME: (Distance Measuring Equipment) Provides radio distance from airplane to ground-based DME stations.

ILS: (Instrument Landing System) Radio navigation aid system used to guide airplane to runaway during landings.

RA: (Radio Altimeter) Provides radio distance from airplane to ground.

WXR: (Weather Radar) Provides pictorial presentation of weather patterns ahead of the airplane.

VOR: (Very High Frequency Omni Range) System provides bearing to ground-based VOR station for navigation.

APU: (Auxiliary Power Unit) System used to generate ground and emergency power.

WEU: (Warning Electronics Unit) Controls warning indications (lights and aurals).

ADF: (Automatic Direction Finder System) Provides bearing to selected ADF ground stations for navigation purposes.

PSEU: (Proximity Switch Electronics Unit) Monitors airplane proximity switch logic.

CSEU: (Control Surface Electronics Unit) Monitors control surfaces.

BPCU: (Bus Power Control Unit) Controls aircraft electrical power distribution.

FSEU: (Flap Slat Electronics Unit) Controls flaps and slats.

MCDP: (Maintenance Control Display Panel) System used to isolate and display autopilot faults on ground only.

PES/PSS: (Passenger Entertainment System/Passenger Service System) Controls intercom, call lights, etc.

SSM: (Sign Status Matrix) Bit on data bus transmission which represents sending units status (OK/Fail).

Figure 1:
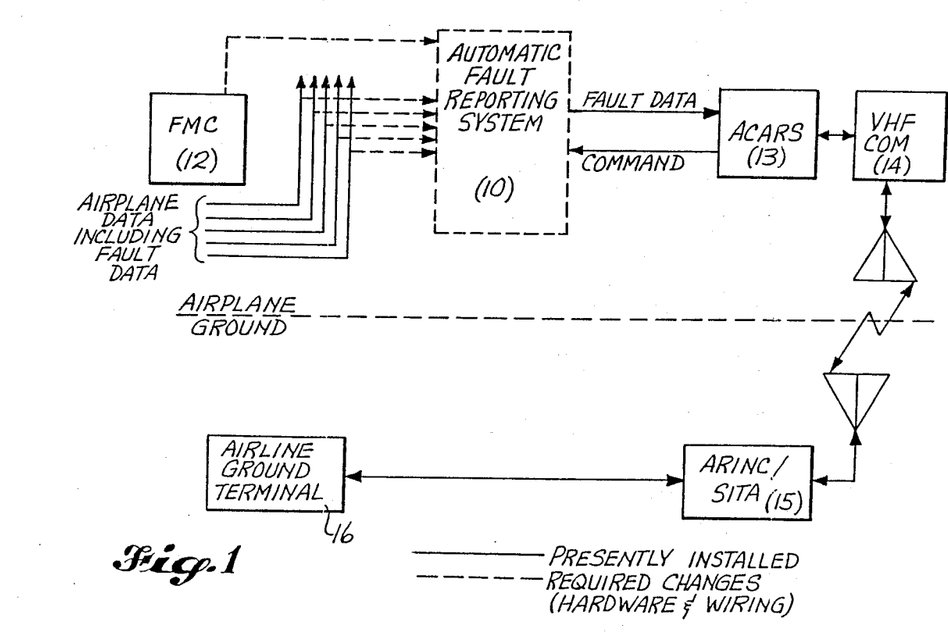
FIG. 1 is a block schematic diagram of a Phase II and Phase III preferred embodiment of the present automatic fault reporting system deemed helpful in showing functional responsibilities of the system and showing, in dotted line representation, the added components and hardware wiring modification required to present systems.

Proceeding now to FIG. 1 and the present AFRS and a more detailed description and operation hereinafter discussed in FIGS. 2-5:

AFRS DESCRIPTION AND OPERATION

A. General

Figure 3:
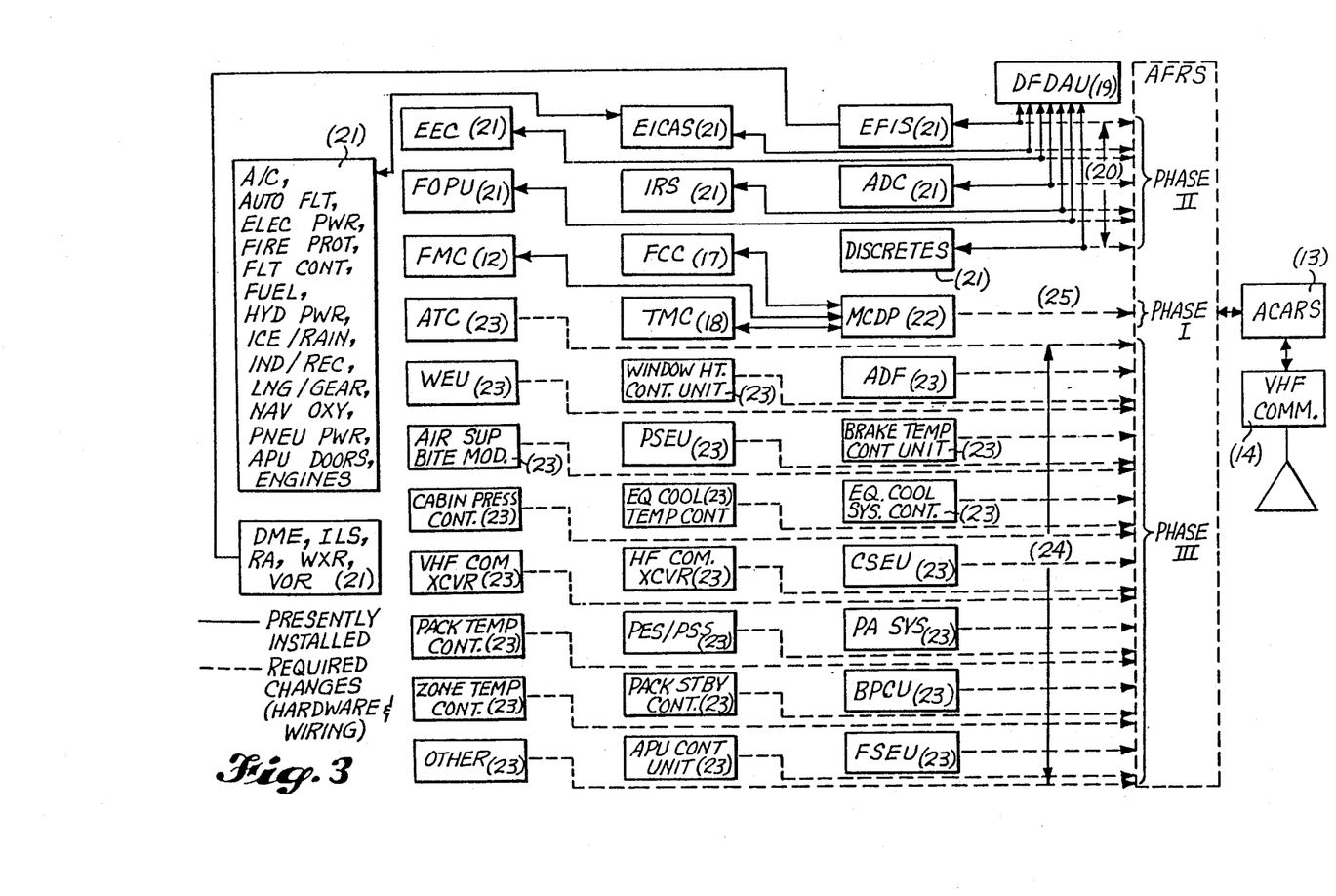
FIG. 3 is a system block diagram showing aircraft installation of the present AFRS wherein the Phase I, Phase II, and Phase III aspects of the installation are detailed to facilitate an understanding of system operation and also how the present system concept may be adapted in steps, and wherein these modifications are shown in dotted line representation.

The Phase I AFRS, as seen in FIG. 3 by the dotted line through connection, has no dedicated management unit. Where this portion only of the AFRS is used, it utilizes the software and inputs of the presently installed MCDP. The changes which are required are as follows:

1. Software changes to the MCDP in order to communicate with the ACARS per ARINC specification 724.

2. Software changes to the MCDP in order to format the fault data output so that it will conform to Airline Transport Association (ATA) specification 100 (as presently written and including any potential future changes caused by AFRS production).

3. Addition of two ARINC 429 low-speed data buses and the associated I/O hardware between the MCDP and ACARS to facilitate two-way communications.

The Phase II and III Automatic Fault Reporting System (AFRS) (FIG. 1) is an all solid-state rack mounted unit that monitors and compares the data outputs of various airplane systems (depending on phase). The AFRS provides fault outputs when data presence, validity, or tolerance errors are detected.

B. Purpose of Equipment

The AFRS provides automatic comparing/monitoring of various aircraft data parameters during flight, and supplies fault outputs when failures are detected to the ACARS for transmission to ground-base maintenance operations. This AFRS system is one to be installed on airplanes and used in conjunction with presently installed airplane systems with the objective of reporting airplane system fault conditions prior to landing. The system would be completely automatic, thus relieving the flight crew from the responsibility of isolating and reporting BITE detectable fault conditions during flight. In addition, the information received by ground maintenance personnel will be much more exact, allowing more time for parts acquisition and the scheduling of maintenance personnel. Depending on how the information is used on the ground and the individual capabilities of each airline, this information can be fed into their main computer and used to assist in inventory control, airplane scheduling, flight crew scheduling, passenger scheduling, periodic maintenance scheduling, etc. The primary objective of the present AFRS system, however, is that of automatic airplane fault reporting. The functional responsibilities of the system are as follows (See FIG. 1):

1. Monitor presently installed digital and analog system outputs which include fault data or data which could be used in fault isolation (11).

2. Detect presently programmed fault indications.

3. By comparing all fault data, determine most likely cause and assign a fault code (e.g. an eight-digit alpha numeric code).

4. Await "send data" discrete from presently installed Flight Management Computer (FMC) (12).

5. On command, sent "data present" discrete to presently installed ARINC Communications Addressing and Reporting System (ACARS) (13) and await "transmission available" discrete.

6. On command, send fault code to ACARS which transmits data via VHF communication (14) to presently installed ARINC/SITA (15) network on ground which in turn routes fault code via land lines to applicable airline (16).

7 Await "transmission complete and received" discrete from ACARS, else repeat until received.

C. Equipment Description

1. Mechanical Description

The phase II and III AFRS is housed in a standard ARINC 600 size (TBD) MCU case and is equipment rack mounted. Electrical connections are made through an ARINC 600 connector (P/N—TBD) located at the rear of the unit.

Figure 2:
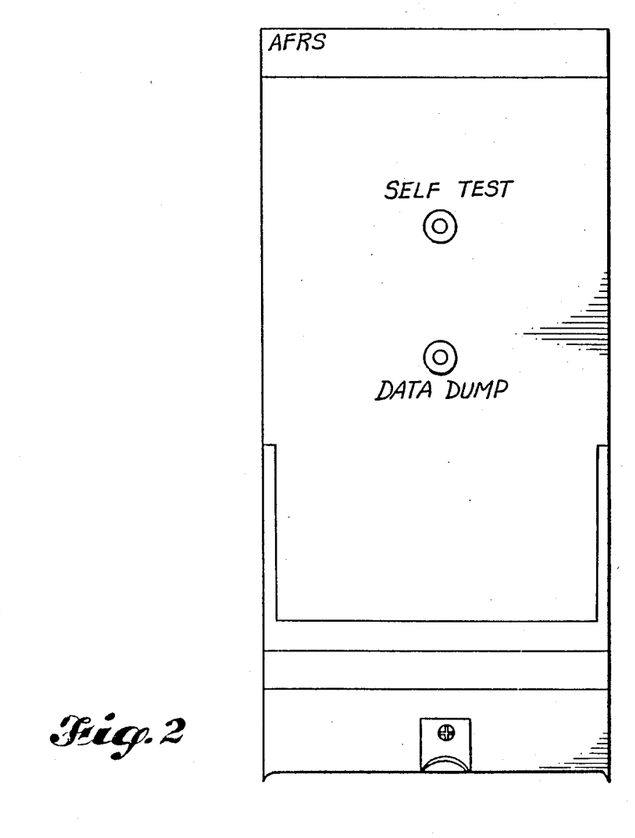
FIG. 2 is a front view of the management unit for the Phase II and Phase III AFRS system shown in FIG. 1, showing AFRS system ground management controls (the system has no dedicated control panel)

The unit consists of an aluminum chassis with attached front panel and top plate, removable circuit cards, and a one-piece dust cover. The front panel contains a swing-out handle for ease of installation/removal, and two push-button switches (SELF TEST and DATA DUMP) located on the upper portion of the panel, as seen in FIG. 2. Cooling air inlet holes are located on the bottom of the unit with outlet holes located on the top of the unit. The importance of this system is the automatic reporting of presently available on-airplane fault information to the individual airline by using presently installed systems for the detection of faults and the unique transmission of the fault data. The unique control and processing of the data on the airplane will require a new box (i.e. ARFS) (10).

2. Electrical Description

The Phase I AFRS (as seen in FIG. 3) utilizes the software provided in the presently installed MCDP. The data will be transmitted from ACARS via ARINC 429 digital data buses and compatible with ARINC 724.

The Phase II and III AFRS monitors and compares the ARINC 429 low-speed outputs of various airplane systems (depending on phase—see FIG. 3). The AFRS provides outputs for transmission by ACARS whenever a difference between monitored system outputs exceed a predetermined value, and/or a warning flag condition is detected.

The rear connector is mounted on a multilayer circuit card which provides interface between the rear connector and internal circuit cards.

The internal circuits are ARINC multilayered circuit cards with a self-contained power supply. The power supply converts the single phase 115 V AC, 400 Hz input power to regulated +12 V, −12 V, +5 V, and +5 V DC keep alive voltages.

The internal circuits monitor and compare the low-speed ARINC 429 outputs of the applicable airplane systems based on discrete inputs. The monitoring and comparison functions result in the transmission to ACARS of parameter warnings via discrete and serial outputs.

3. Control and Indicators

Refer to FIG. 2 for a view of the Phase II and III AFRS front panel controls and Table I for their description.

TABLE I

| CONTROL/INDICATOR | FUNCTION |
|---|---|
| SELF-TEST switch | A momentary pushbutton switch used to manually initiate an end-to-end test of the AFRS. |
| DATA DUMP switch | A momentary pushbutton switch |

| TABLE I-continued | |
|---|---|
| CONTROL/INDICATOR | FUNCTION |
| | that momentarily disables all fault monitoring circuits in the AFRS, and resets any fault output to a no fault condition. When the DATA DUMP switch is released, any fault condition detected by the AFRS for the past (TBD) flights will result in a fault warning output. |

D. Theory of Operation

1. General

The basic theory of operation for the Phase I AFRS is the same as that of Phases II and III, although the processing is provided by the MCDP rather than a dedicated AFRS box (10).

The Phase II and III AFRS monitor and compares outputs from various aircraft electronic units. Failure outputs are provided to the ACARS whenever faults or excessive differences are detected between monitored inputs.

2. System Installation

Due to the potential change impact on present airplane installations, the system can be installed in three phases (Phases I, II, and III). The first phase will only be software changes to the MCDP and two new ARINC data buses (25) between the MCDP (22) and the ACARS (13). This will be used to prove the concept and will provide all autopilot (FCC (17), FMC (12), TMC (9)) fault data to the ground via ACARS (13) and ARINC/SITA (10). The second phase will require the new AFRS box (10) (hardware) which will basically be a data management computer. This will also require new wiring (20) from the DFDAU (9) inputs (21) and reprogramming of some of the inputting systems. Phase II will provide fault data from a majority of the Navigation and Warning Systems (2). Phase III will include the fault data from every system on the airplane (23). This phase is presently considered as a future evolvement of the system due to extensive wiring (24) and software changes which will be required to presently installed system. The AFRS (10), however, will be designed to accommodate this future expansion capability. In conclusion, for present airplanes (i.e. 757/767), the present plan is to proceed through Phase II in order to provide the greatest amount of fault data while requiring the least amount of change to the airplane.

3. Simplified Theory of Operation (refer to FIG. 3)

Digital inputs to the AFRS are received from the system listed in Table II (by phase) via ARINC 429 low-speed data buses. Also, analog and discrete inputs are received via standard airplane wiring. Each phase will include the information received by the previous phase(s). The digital inputs are monitored for signal presence and validity. Input discretes from various equipment are received via program pin selections in the aircraft wiring. Failure outputs are provided if data inputs are not present, not valid, or excessive differences are detected between monitored inputs.

TABLE II

| AFRS SYSTEM INPUTS | | |
|---|---|---|
| PHASE I | PHASE II | PHASE III |
| MCDP | EFIS | ATC |
| Incl data from: | Includes data from: | ADF |
| IRS | DME | Window Ht |
| RA | ILS | Cont. Unit |
| ADC | RA | Brake Temp |
| ILS | WXR | Cont. Unit |
| MCDP | VOR | PSEU |
| FCC | EEC | Air Supply |
| TMC | ADC | Bite Mod. |
| FMC | IRS | Equip. Cool. |
| HYD PWR | FQPU | Sys. Cont. |
| FLT CONTROLS | EICAS | Unit |
| ACARS | Includes data from: A/C | Equip. Cool. Temp. Cont. |
| | Auto Flt  LNDG GEAR | Unit |
| | Elec. Pwr  NAV | Cabin Press. |
| | Fire Prot.  OXY | Cont. Unit |
| | Flt. Cont.  PNEU PWR | CSEU |
| | Fuel  APU | HF COM XCVR |
| | Hyd. Pwr.  DOORS | VHR COM XCVR |
| | ICE/RAIN  ENGINES | PA System |
| | IND/REC | PES/PSS |
| | | Pack Cont. Unit |
| | | BPCU |
| | | Pack Stby Unit |
| | | Zone Temp. Cont. |
| | | FSEU |
| | | APU Cont. Unit |
| | | Others |

4. Phase II and III AFRS Functional Theory of Operation (refer to FIG. 4)

Figure 4:
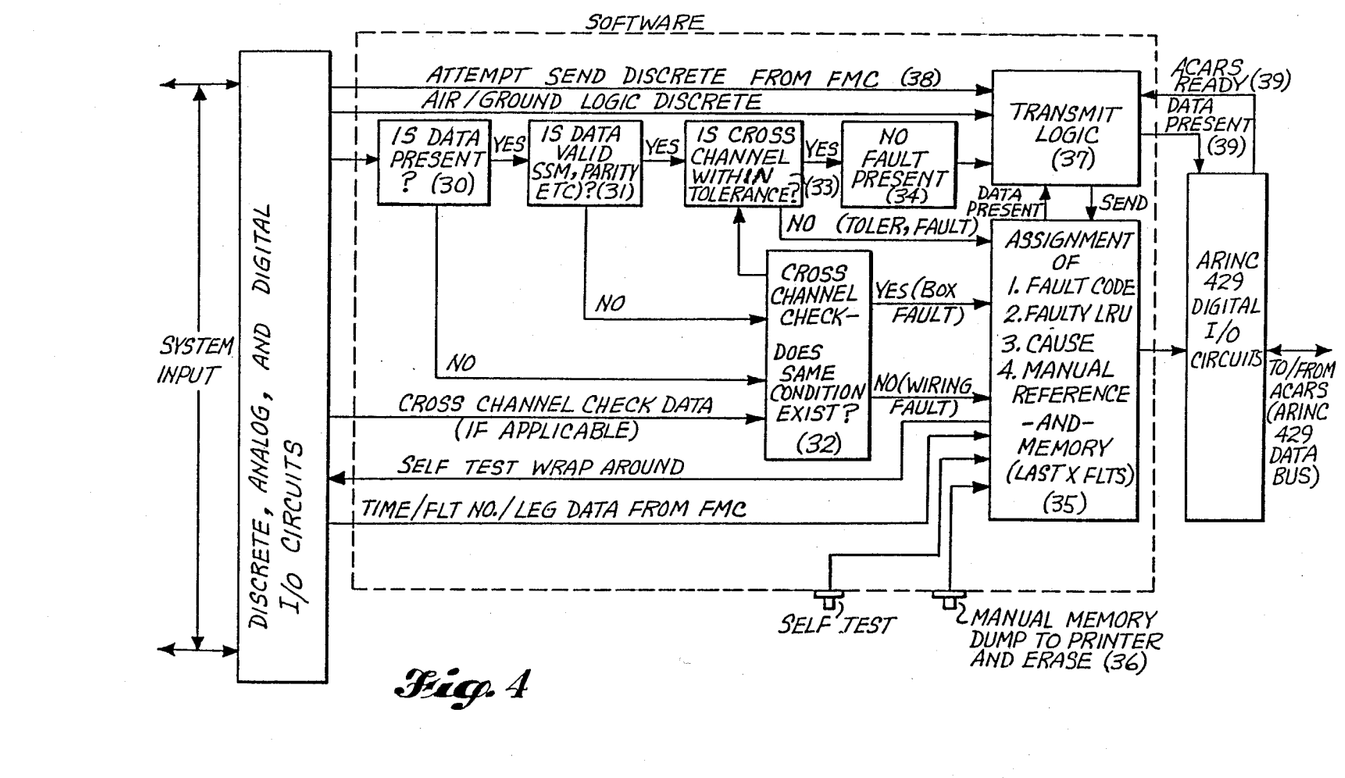
FIG. 4 is a block diagram of the present AFRS system illustrated from a functional operation viewpoint believed helpful in further understanding system operation; and, FIG. 5 is exemplary of an IRU-Right fail, e.g. illustrative of a typical fault condition in detail within the complexity of the present system to enable a better understanding of subsystem operation with the present AFRS.

The internal circuits monitor and compare the digital serial outputs from the systems listed in Table II.

The internal circuits consist of the below listed six major sections, plus the power supply.

a. Processor
b. Memory (Electrically Programmable Read Only Memory) (EPROM) and Random Access Memory (RAM)
c. Input discretes
d. Output discretes
e. Serial I/O
f. Clock and timing The processor obtains instructions from the ROM and performs operation on data from readwrite memory and the I/O devices. The processor is a complete (TBD) bit parallel device with a (TBD) microsecond instruction cycle.

The memory consists of (TBD) K EPROM and (TBD) K RAM. A (TBD) bit latch is included in the memory section to hold the lower address bits because the processor bus is multiplexed. The memory section also includes a select decoder that addresses the correct memory locations, and provides enable inputs for the I/O devices.

The input discretes are ground or open inputs from program pins and the front panel switches. (TBD) spare input discretes are provided. The input discretes are used by the processor to determine the operating characteristics of the AFRS. The input discretes are multiplexed into (TBD) groups of (TBD), applied to the programmable peripheral interface (PPI) input port, and onto the processor data bus.

The output discretes are obtained from the processor data bus, and applied through the PPI output port to drivers that provide a ground or open output. (TBD)

discretes outputs are available; (TBD) left system fault outputs, (TBD) right system outputs, (TBD) center system fault outputs, and one AFRS fault warn output.

The serial I/O section consists of ARINC receivers, transmitters, a multiplexer, a Universal Asynchronous Receiver-Transmitter (UART), and interface devices. The ARINC 429 digital serial inputs are applied through separate receivers, an eight channel multiplexer, and a latch to the processor data bus. The processor data bus outputs are buffered and applied to the UART. The UART outputs are modified by transmitters to provide ARINC 429 digital serial outputs to the ACARS.

The clock and timing section provides outputs for proper AFRS operation. The clock 1 output is 6.25 MHz for the processor, and a 20 Hz processor interrupt output. The clock 2 output is 2.0 MHz for the operation of the serial I/O section, as well as other timing outputs.

Extensive internal monitoring circuits are used to determine the operational condition of the AFRS. The monitoring circuits include the following:

a. Input and output digital data wraparound loops
b. Processor activity monitor
c. Processor instruction execution monitor
d. Memory checksum tests
e. Power supply monitors Failure of a monitored function or circuit results in an AFRS fault warn output, and/or an appropriate data fault or annunciator output.

The power supply converts the 115 V AC, 400 Hz aircraft power to +5, +5 KA, +12, and −12 V DC power required for AFRS operation. The +5 KA is a keep-alive voltage applied to the RAM to maintain memory during power switching or transients. The +5, +12, and −12 V outputs are short circuit protected by regulator/limiter/shutdown circuits. Monitor circuits will inhibit the AFRS and cause an AFRS fault warn output if the power supply voltages are not correct.

5. AFRA Logic (FIG. 4)

Note: Due to system and system output redundancy, cross channel checks are used to isolate faults between wiring or box problems. Also, due to redundancy and the vast number of systems and wiring, it is impossible to illustrate the entire airplane's systems.

a. The AFRS (10) will continuously receive and monitor real time fault data from each of the inputting systems. All data will be formatted by time of occurrence, flight number, flight leg, etc. for tracking faults by AFRS. The first check will be for presence (30) (i.e. is the data there and correctly formatted). If data is present, the AFRS will check the information on the bus for failure signals from the outputting box (31). If the data is not present or a failure signal is present on a specific bus, the AFRS will check all other applicable buses for the same condition (32). Depending on the combination of failures the AFRS will isolate the fault to either the box or a specific area of the wiring. If the data is both present and valid, the AFRS will check that all redundant systems (ones with more than one identical box, Ex. left/right/center inertial reference system) data is within tolerance (33).

b. This will be accomplished by preprogrammed tolerance values (generally set by the certification agencies-FAA/CAA).

c. If no problems are found and no previous fault data is stored in memory, the transmit logic will be inhibited (34).

d. If a problem is found, the AFRS will provide the following information to ACARS when the send data sequence occurs (35):

(1) Time, flight number, leg, etc. when fault occurred.
(2) An eight-digit numeric fault code which represents the fault's cause.
(3) What box or wire failed in English (optional)?
(4) What caused the fault in English (Ex. circuit card) (optional)?
(5) The specific maintenance manual procedure reference (Ex. Removal Installation, Fault Isolation, etc.) (optional).
(6) Any other information concerning the fault desired by operator (Ex. occurrences, etc.) (optional).

e. Also, a manual memory dump switch (36) will be installed. When pressed this will dump all faults which occurred in the last X (TBD) number of flights to an optionally installed printer (ACARS) including all fault information. This will also erase all faults stored in memory.

f. Once a fault has been stored, a discrete will be sent to the AFRS transmittal logic (37) stating that fault data is present. The AFRS will then wait for an "attempt-to-send" discrete (38). This discrete will most likely be from the FMC at a (TBD) time in the flight. It could, however, be a manual command from the flight crew or a polled request from the ground via ACARS. Once the send discrete is verified, AFRS will poll ACARS for transmit time. When time is available, ACARS will command AFRS to dump all fault data for that flight leg (39). AFRS will repeat this until ACARS returns a "Transmission Complete and Received" discrete.

g. On the ground, the operator will use this information to aid his maintenance scheduling, parts acquisition, and control flight crew and passenger rescheduling (if required) and any other application desired to reduce airplane turnaround time.

Figure 5:
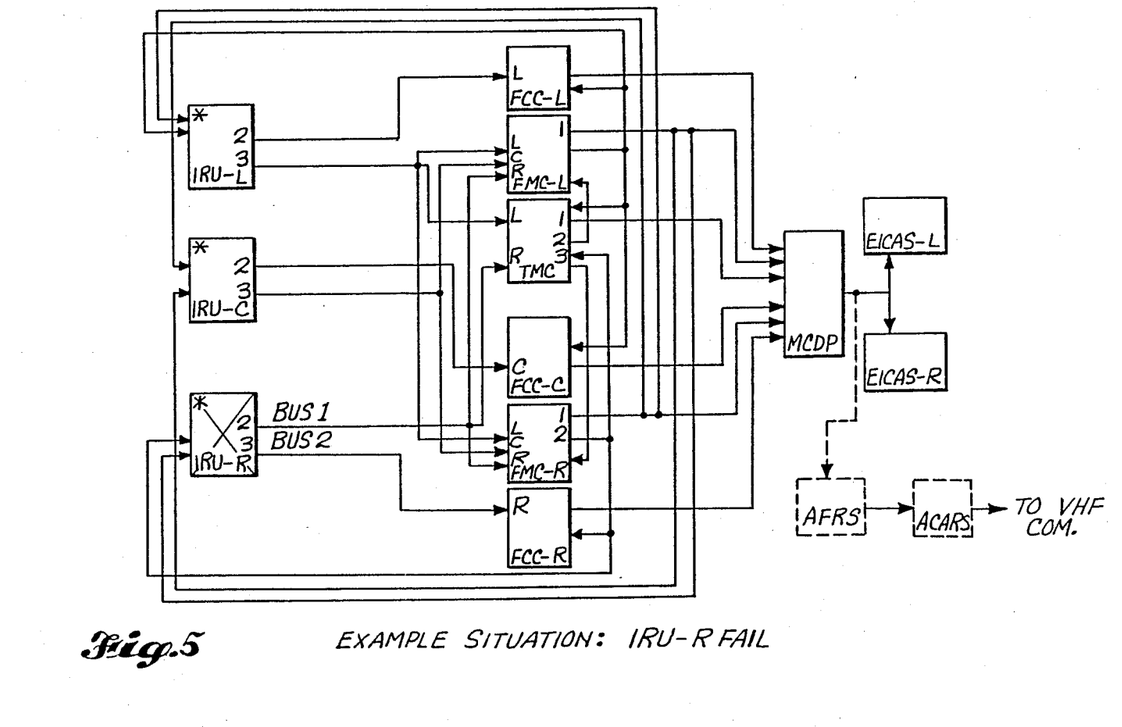

6. Example Situation: IRU-Right FAIL (FIG. 5)

a. To illustrate a typical fault and the complexity of a system's installation, the following example and simplified block diagram is provided:

(1) IRU-Right detects an internal fault and sets its SSM (Sign Status Matrix) bit to fail.
(2) This will be transmitted on both BUS 1 and BUS 2 to the FCC-Right, the TMC, and the FMC-Right and Left.
(3) These, in turn, will recognize the IRU-Right has failed and transmit via their respective output buses the IRU-Right SSM Fail discrete to the IRU-Left and Center; the FCC-Left and Right; the FMC-Left, -Right and -Center; the TMC; the IRU-Right; and the MCDP.
(4) This loop, created by cross channeling, provides a high degree of confidence in isolating a fault.
  NOTE: The systems of FIG. 5 are not the only systems which receive IRU data. Referring to FIG. 3, all systems in Phases I and II, and many in Phase III, receive IRU data. Therefore, FIG. 3 does not represent the entire picture of the IRU interface but is sufficient for conceptual purposes.
(5) The MCDP will transmit the IRU-Right fail discrete to the AFRS which will cross check all of its input buses.
(6) At this point, the AFRS will know conclusively that the IRU-Right has failed. It will store this data and assign to it all required and optionally selected identifiers and references.

(7) When the FMC commands AFRS to send data, the AFRS will poll ACARS for transmission time. If the line is not busy, ACARS will transmit the data to an ARINC/SITA ground station via the airplane's VHF communications system. ARINC/SITA, in turn, will transmit the data to the correct operator via land lines.

(8) When the information reaches the operator, they will use it (depending on individual capability) to schedule maintenance and any other operations they desire.

We claim:

1. In an automatic fault reporting system:

means for providing fault code information;

an aircraft communication addressing and reporting system for providing a signal representative of a ready condition and a discrete signal representative of a transmission complete and received condition;

a transient logic circuit responsive to said fault code information and said signal representative of a ready condition of an aircraft communications addressing and reporting system for receiving said fault code information;

said transient logic circuit dumping said fault code information for transmission through said aircraft communications addressing and reporting system in response to the presence of said signal representative of a ready condition of said aircraft communications addressing and reporting system, and further repeating said dumping of said fault code information for transmission through said aircraft communications addressing and reporting system until receiving said discrete signal representative of said transmission complete and received condition from said aircraft communications addressing and reporting system.

* * * * *